(12) United States Patent
Antunez

(10) Patent No.: US 6,766,825 B2
(45) Date of Patent: Jul. 27, 2004

(54) TOP-LOADED REPLACEABLE FLOW CONTROL AND PARTICULATE STRAINER

(76) Inventor: Bruce A. Antunez, 1143 Indian Springs, Glendora, CA (US) 91740

( * ) Notice: Subject to any disclaimer, the term of this patent is extended or adjusted under 35 U.S.C. 154(b) by 0 days.

(21) Appl. No.: 10/211,977

(22) Filed: Aug. 2, 2002

(65) Prior Publication Data

US 2004/0020538 A1 Feb. 5, 2004

(51) Int. Cl.$^7$ .............................................. E03B 7/07
(52) U.S. Cl. .................. 137/549; 137/315.08; 137/414; 137/436; 210/125; 210/232; 210/429; 210/432; 210/488
(58) Field of Search ............................ 137/315.08, 436, 137/549, 547, 414, 15.26; 210/123, 125, 429, 431, 432, 448, 232, 435, 445, 446, 488

(56) References Cited

U.S. PATENT DOCUMENTS

| | | | | |
|---|---|---|---|---|
| 1,188,371 A | * | 6/1916 | Illg | 210/429 |
| 1,617,048 A | * | 2/1927 | Gregory | 210/429 |
| 2,647,636 A | * | 8/1953 | Rafferty | 210/238 |
| 2,658,625 A | * | 11/1953 | Rafferty | 210/445 |
| 2,811,169 A | * | 10/1957 | Buchanan | 137/436 |
| 4,052,315 A | * | 10/1977 | Lindsay, Jr. et al. | 210/232 |
| 4,596,269 A | * | 6/1986 | Stephens | 137/436 |
| 4,646,779 A | * | 3/1987 | Johnson | 137/426 |
| 4,765,363 A | * | 8/1988 | Pi-Yu | 137/437 |
| 4,973,402 A | * | 11/1990 | Johnson et al. | 210/488 |
| 5,280,803 A | * | 1/1994 | Swift et al. | 137/414 |
| 5,340,032 A | * | 8/1994 | Stegmaier et al. | 210/432 |
| 5,715,859 A | * | 2/1998 | Nichols-Roy | 137/436 |
| 5,904,176 A | * | 5/1999 | Li | 137/426 |
| 6,019,128 A | * | 2/2000 | Reiter | 137/549 |
| 6,244,292 B1 | * | 6/2001 | Antunez | 137/414 |
| 6,260,574 B1 | * | 7/2001 | Nichols-Roy | 137/414 |
| 6,412,645 B1 | * | 7/2002 | DuHack | 137/549 |
| 2003/0052052 A1 | * | 3/2003 | Boast et al. | 210/429 |

* cited by examiner

Primary Examiner—George L. Walton
(74) Attorney, Agent, or Firm—Donald D. Mon

(57) ABSTRACT

A ballcock valve with a valve body mounted on a tubular riser with a valve seat which passes water from the riser. The valve body includes a base and a removable cap which enclose valve workings. A screen body passed through the valve seat has a central passage and openings to the passage that exclude particulate solids. A flow control is fitted to the screen body. The combined screen body and flow control is upstream from the valve seat. Preferably a retainer releasably holds the screen body against axial movement when installed.

2 Claims, 3 Drawing Sheets

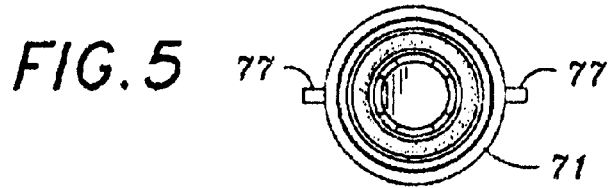
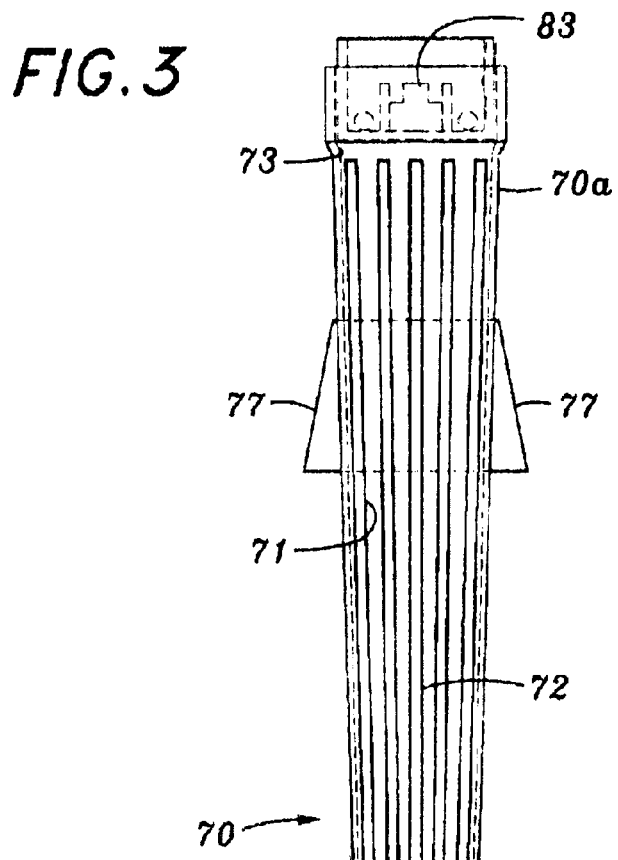
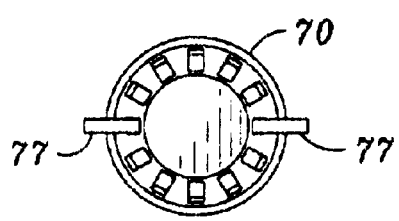

TOP-LOADED REPLACEABLE FLOW CONTROL AND PARTICULATE STRAINER

FIELD OF THE INVENTION

A readily serviceable screen for excluding particulate solids from rate-controlled pressure-actuated ballcock valves of the type used in toilet tanks.

BACKGROUND OF THE INVENTION

Municipal regulations regarding the use of water in the flushing of toilets generally require the use of flow-rate controls (flow controls) to limit the amount of water discharged for each flush and to discourage multiple flushes. Also, especially when the ballcock mechanism depends on a pressure differential, flow at an excessive rate can interfere with the proper functioning of the ballcock valve itself.

Accordingly, modern pressure-differential ballcock valves are mostly provided with a flow control whose function is to limit the rate of flow, making it constant over a substantial range of pressures. A pervasive problem with flow controls, and also with the pressure-responsive mechanism is its sensitivity to particulate solids that tend to plug up the necessarily small orifices. Many times this is solved in the control mechanism by placing rods in the critical orifices with clearances that movement of the rod tends to keep clear and which are too small for the particulates to pass. Also, it is common to place screens in the ballcock's water supply riser. The problem here is evident. After a time, the upstream side of the screen becomes clogged and the valve must be serviced to flush the line and clean the screen.

This sounds like a simple matter, and to a qualified person it is. A plumber finds it a pleasant, quick and financially rewarding task, and a householder who is skilled with his hands and is knowledgeable can do the job instead. However, in conventional installations the tank must be drained, the ballcock valve removed completely, the water turned back on to flush the line, taking care to divert the stream, the screen cleaned, and the valve re-installed. The task to the average person is not simple at all.

It is an object of this invention to provide a ballcock valve with a readily removable top mechanism which can expose a readily removable and replaceable combination of screen and flow control that can be lifted out to be cleaned and to permit the line to be flushed, and then replaced along with the top. This is an elegantly simple matter which a person with almost no skill can accomplish.

BRIEF DESCRIPTION OF THE INVENTION

This invention is carried out in a ballcock valve which has a tubular water supply riser rising into a tank. Atop the riser there is supported a pressure differential mechanism (sometimes herein called "valve workings"), whose opened or closed setting is determined by the elevation of a float in the tank.

The valve workings itself is housed in a body in a chamber formed of a base and a cap. Removal of the cap gives access to to the valve workings, and permits its removal. A combination flow-control and screen is held in the riser, directly upstream from the valve workings.

According to this invention, the screen projects into the riser to keep particulate solids in the riser, out of the chamber and out of the flow control.

The above and other features of this invention will be fully understood from the following detailed description and the accompanying drawings, in which:

BRIEF DESCRIPTION OF THE DRAWINGS

FIG. 3 is a side view of a combined screen and flow control;

FIG. 4 is a bottom view of FIG. 3; and

FIG. 5 is a top view of FIG. 3.

DETAILED DESCRIPTION OF THE INVENTION

Figure 1:
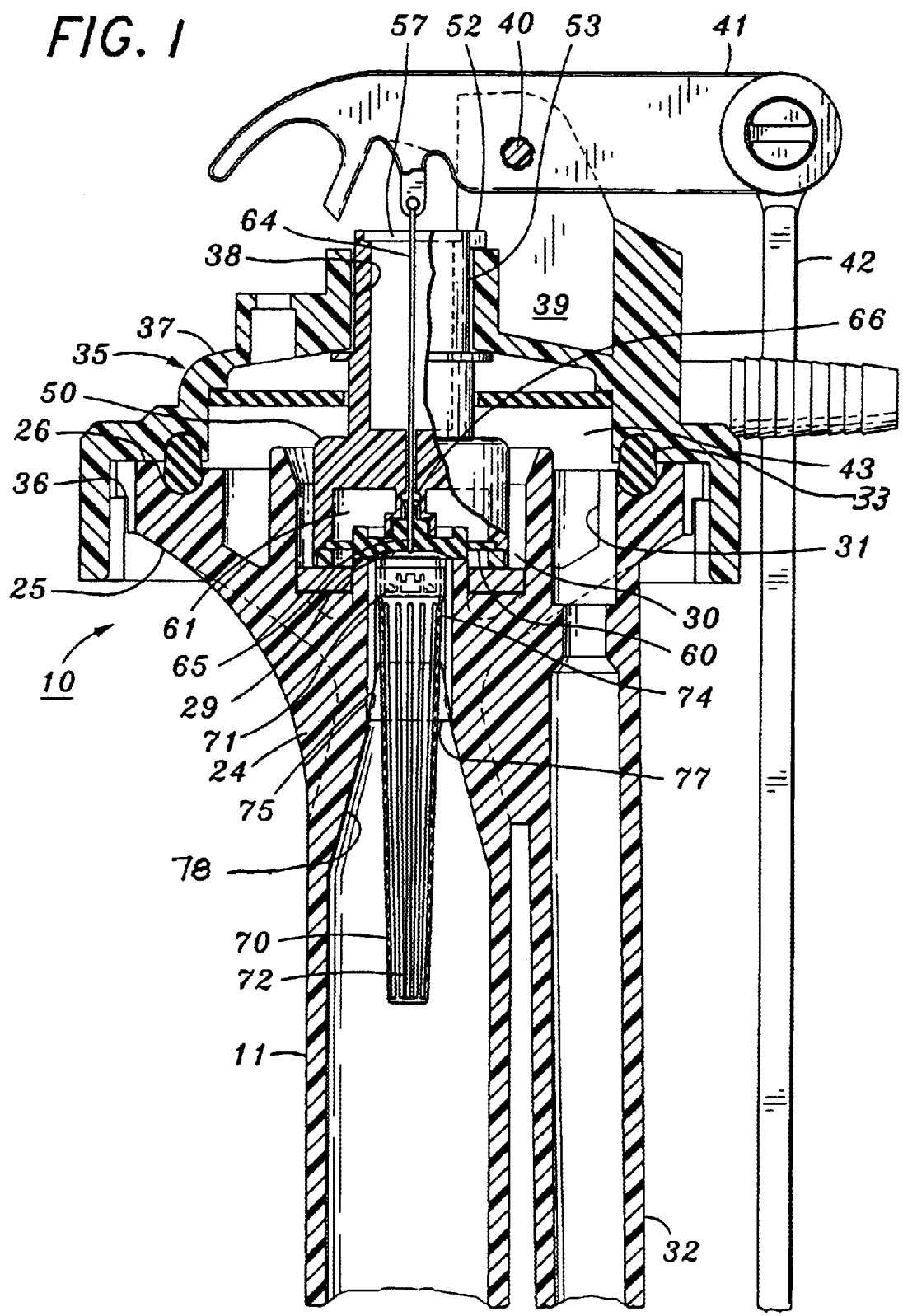
FIG. 1 is an axial cross-section of a ballcock valve incorporating the preferred embodiment of the invention.
Figure 2:
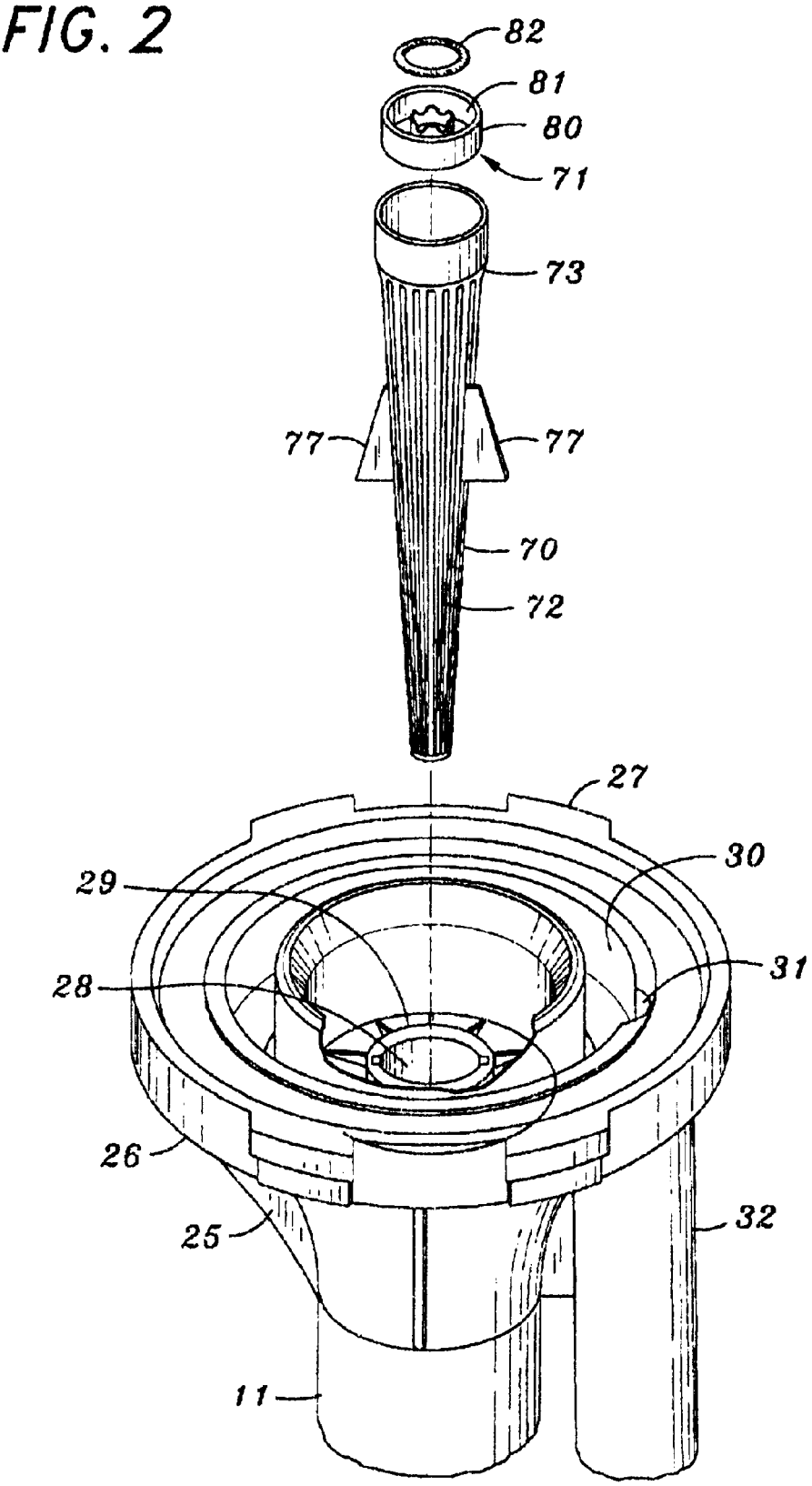
FIG. 2 is an exploded view of a portion of the valve of FIG. 1, with its upper portion removed.

A ballcock valve 10 incorporating the invention is shown in FIG. 1. A vertical tubular water supply riser 11 is connected by means not shown to a source of water. It is conventionally fitted into a port in the bottom of a water tank. The tank holds water to be released to the toilet when a flush is needed. The details of mounting the riser are omitted as being unnecessary to an understanding of the invention.

The ballcock valve includes a body 24 having base 25 with a peripheral rim 26. This rim bears a set of bayonet flanges 27. A central opening 28 opens from the riser into a valve seat 29, which in turn opens into a dish-like, flow channel 30. A tank supply port 31 discharges into a tank supply tube 32. A peripheral seal 33 extends around an upper surface.

The body also includes a cap 35 having bayonet flanges 36 which can engage flanges 27 when in one rotated position, and can free the cap in another. The cap has a top 37 with a central aperture 38. It also carries a hinge base 39 and hinge pin 40 to support a lever 41. Lever 41 and arm 42 support a float (not shown), whose elevation in a tank in which the valve is mounted determines the opening or closing of the valve and thereby the water level in the tank.

Base 25 and cap 35 when joined together form a chamber 43. Valve workings 50 are mounted in the chamber. They are releasably held to the cap. As shown in FIG. 1, when the cap is tightened onto the base, the columnar top 57 of the workings fits in the central opening of the cap and is held there, for example by a tooth 52 which passes through a slot 53 when aligned. When the top is turned, the tooth holds the workings to the cap. The details of these workings will be found in applicant's co-pending U.S. patent application Ser. No. 09/487,551 filed Jan. 19, 2000, entitled Ballcock Valve For Water Tanks now U.S. Pat. No. 6,244,929 issued Jun. 12, 2001, which is incorporated by reference herein in its entirety to show these details.

Briefly stated, these valve workings include a flexible diaphragm 60 which can be moved against valve seat 29 to close it against flow, and moved away from it to open the valve to flow. The selection is made by changing the pressure in valve chamber 61 from atmospheric to water system pressure. This is accomplished by positioning a shaped control rod 64 in vent passage 65. This rod is moved by lever 41, which moves in response to water level in the tank. When vent passage 65 is open it permits system pressure to enter the valve chamber 61 and the valve will be closed, passage 66 being closed. When passage 65 is closed and passage 66 is opened, the diaphragm will move upwardly to open the valve. This is a well-known operation, whose details are unnecessary to an understanding of this invention. What is important is that when the cap is attached to the base, the workings are in place and the valve is operable.

The objective of this invention is to keep particulate solids out of the valve beyond the valve seat. For this purpose a screen 70 is provided, to which flow control 71 is attached.

Screen 70 is a body 70a formed as a hollow tapered structure with a peripheral wall 71 having a plurality of axially extending slots 72 of a size chosen to exclude undesired solids. A collar 73 on the screen fits snugly in wall 74 of the riser (a socket may if desired be provided). Axial slits 75 are formed in the riser wall.

Radial protuberances 77 are formed on the screen body. In the illustrated embodiment, these are formed as fingers which are reversely tapered so that, when they have been moved past a tapered portion 78 of wall 74 of the riser, the screen can be rotated and they abut it. This will prevent axial removal of the screen unless and until the screen is turned again to align the fingers and slits. When they are aligned, water pressure in the riser will force the screen out of the tube. Until the screen is turned it will resist removal.

The illustrated fingers are tapered fins to match an adjacent tapered structure. Instead a straight finger adapted to engage a flat shoulder could be used for the same purpose.

Flow control 71 is a conventional type. It is a characteristic of these devices that, over a relatively wide pressure range, the flow rate through the valve will be essentially constant. These flow controls, include a body 80 with ports 81 facing upstream, and circular flexible O rings 82 which adjustably cover these ports so that when the pressure varies the flow rate remains constant.

Importantly to this invention, the flow control is immediately downstream from the screen slots, so it is protected against being fouled by solids. As a convenience, the flow control can include a slot 83 which when engaged by a blade can provide for rotating the screen to align (or misalign) the fins relative to the slots.

To service this valve, one needs only to turn the cap to release and remove it, rotate the screen to align the fingers and slots, turn on the water pressure to expel the screen and flow control, and let the water run long enough to clear the tube of debris. Then turn off the water, clean the screen, and reverse the procedure. That is all.

The fingers shown are a single example of radial protuberances which can interfere with surrounding structure unless aligned with a release path such as an axial slit.

This invention is not to be limited by the embodiments shown in the drawings and described in the description, which are given by way of example and not of limitation, but only in accordance with the scope of the appended claims.

What is claimed is:

1. In a ballcock valve of the type having a water supply riser mounted in a valve seat, a body atop said riser having a base and a removable cap attachable to said base whereby to form a chamber, valve workings inside said chamber removable when said cap is removed to give access to said seat and adapted selectively to open or to close said valve seat, the improvement comprising:

a screen insertable into said riser through said seat so as to project into said riser, said screen including a screen body, a central flow passage in said screen body, passages opening into the riser to retain solid particulates in said riser and prevent their passage into said central passage, and a flow control held to said screen body in fluid communication with said central passage to limit the rate of water flow from the riser, a radial protuberance on said screen body releasably to hold the screen body to the valve body, said radial protuberance being a finger on said screen body, and in which an axial slit is provided in said body upstream of said valve seat, said screen body being rotatable in said valve body, whereby with the finger and slit aligned the screen body can be passed through said valve seat, and when fully inserted can be rotated past the slit, and the finger and screen body will then be retained against axial removal from the valve body, whereby with the cap and valve workings removed from the base, the screen body along with the flow control can be removed from the riser through the valve seat, and particulate solids flushed from the riser, after which a screen body and flow control can be inserted into the riser, and the valve workings and cap replaced to restore the ballcock valve to working condition.

2. Apparatus according to claim 1 in which said screen body includes a socket in which said flow control is fitted and frictionally retained.

* * * * *